S. NOLAN.
CUTTLEBONE HOLDER.
APPLICATION FILED OCT. 15, 1913.

1,113,816.

Patented Oct. 13, 1914.

UNITED STATES PATENT OFFICE.

SAMUEL NOLAN, OF SAN FRANCISCO, CALIFORNIA.

CUTTLEBONE-HOLDER.

1,113,816.   Specification of Letters Patent.   Patented Oct. 13, 1914.

Application filed October 15, 1913. Serial No. 795,293.

*To all whom it may concern:*

Be it known that I, SAMUEL NOLAN, a citizen of the United States, residing in the city and county of San Francisco and State of California, have invented new and useful Improvements in Cuttlebone-Holders, of which the following is a specification.

This invention relates to a holder attachment for bird cages, suitable for holding cuttle bone, apple and other solid articles of food.

It is an object of the present invention to provide a simple, inexpensive, sanitary holder adaptable to cages to hold all sorts and sizes of cuttle bone and the like, and to be automatically adjustable to the bone or other solid food, as the latter is consumed.

The invention consists of a spring wire bent into V-shape with divergent arms and fitting a coacting ring or opening in a cage in such fashion that the food will be embraced between the resilient arms at the apex of the angular member and the walls of the opening.

The invention further consists of the parts and the construction and combination of parts as hereinafter more fully described and claimed, having reference to the accompanying drawings, in which,—

Figure 1:
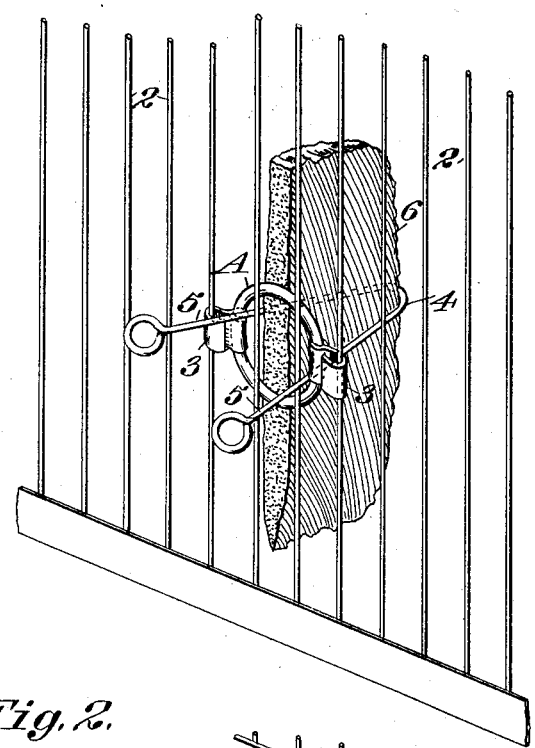
Figure 2:
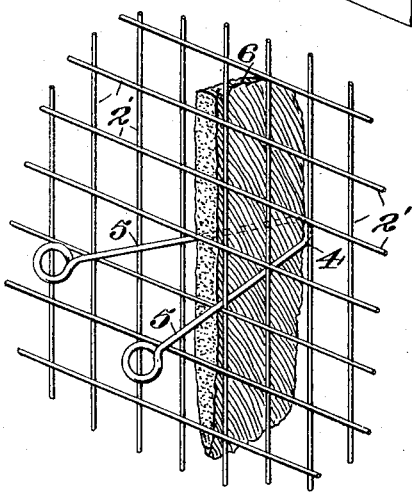

Figure 1 is a perspective of a portion of a cage, showing the application of the invention. Fig. 2 is a perspective of the holder as mounted in a cage of wire mesh.

In Fig. 1, A is a ring clamped at 3 to a wall of a bird cage whose vertical bars are indicated at 2. Projecting inwardly is a V-shaped holder 4 made of suitable material here shown as a piece of spring wire centrally bent on itself to form the divergent arms 5. The arms 5 of the holder extend outwardly beyond the bars 2 of the cage and provide a finger hold by which they may be compressed to pass the holder through the ring, or if a wire mesh cage is used, as in Fig. 2, through the squares. The cuttle bone 6, or apple, or other substance to be held is clamped in the apex of the holder and against the side of the cage, and is automatically drawn there-against by the inclined divergent arms 5 working in the ring or opening in the cage. By spreading the arms more or less they are accommodated to articles of various size, and as the article is consumed they automatically continue their grip.

In Fig. 2 the holder 4 is shown as adjusted between the rectangular meshes of a cage wall formed of meshed netting 2', in which use of the holder 4 the restraining or limiting ring A may not necessarily be employed, as the sliding or expanding movement of the arms of the holder 4 would be controlled by the cross wires of the meshed wall 2'.

Having thus described my invention what I claim and desire to secure by Letters Patent, is:

A holder for cuttle bone and the like, consisting in the combination with a slatted cage of a piece of wire bent into substantially V-shaped form with straight legs inserted between the slats of the cage with the legs projecting outward, said legs forming inclined planes converging at the apex of the bend within the cage and coacting frictionally with means on the cage automatically to project the holder toward the outside of the cage and thereby automatically clamp within the holder and against the cage articles that vary in size.

In testimony whereof I have hereunto set my hand in the presence of two subscribing witnesses.

SAMUEL NOLAN.

Witnesses:
 EDWIN A. TURNER,
 ARTHUR C. LAWRENCE.

Copies of this patent may be obtained for five cents each, by addressing the "Commissioner of Patents, Washington, D. C."